United States Patent Office 3,360,940
Patented Jan. 2, 1968

3,360,940
FUEL SUPPLY SYSTEM FOR A JET PROPULSION ENGINE INCLUDING REHEATERS
Ronald Rimmer, Churchdown, Gloucester, England, assignor to Dowty Fuel Systems Limited, Cheltenham, England, a British company
Filed June 20, 1966, Ser. No. 558,823
6 Claims. (Cl. 60—237)

This invention relates to a fuel supply system for a jet propulsion engine, and in particular with a fuel distribution system for a number of reheat burner galleries in an internal combustion gas turbine engine.

In an internal combustion engine having a number of reheat galleries which are brought successively into use with increased reheat fuel flow, and having an adjustable discharge nozzle for the jet efflux, it has been proposed to use a feedback signal of nozzle area to control the successive introduction of these galleries when increased reheat fuel flow is selected. It is found, however, that when an additional gallery is selected, a portion of the total reheat fuel is diverted for priming the additional gallery without being burnt and that the discharge nozzle responds to the temporarily reduced combustion of reheat fuel by decreasing in area. The feedback signal therefore causes the fuel supply to the additional gallery selected to be shut down, and an increase in combustion at the one or more galleries already in use, thus constituting an unstable cycle which is repeated.

According to the present invention, a fuel distribution system for a number of burner galleries in a jet propulsion engine comprises a valve means interposed between a variably controllable main supply of fuel and each burner gallery, each valve means subsequent to that supplying the first gallery at which fuel is burned having also a supply of priming fuel connected thereto and being so arranged that, during the first stage of opening of the valve means, priming fuel flows to the corresponding burner gallery, and during a subsequent stage of opening, the controllable main fuel supply is connected to the burner gallery and the priming flow is stopped, an input selector member movable, conjointly with the control of the main fuel supply, between an OPENING selection position and a CLOSING selection position, in respect of each valve means, a feedback selector member movable in response to a variable engine parameter which is dependent upon the rate at which fuel is burned, said feedback selector member being movable in respect of said valve means to an OPENING selection position when the variable engine parameter lies within a specified range of values, and being movable to a CLOSING selection position when the variable engine parameter lies outside said specified range, and a servo device controlled by the input selector member and by the feedback selector member, the servo device acting to open the valve means only when both the input selector member and the feedback selector member are in their OPENING selection positions, and acting to close the valve means when either of the selector members is in its CLOSING selection position or when both of the selector members are in their respective CLOSING selection positions.

One embodiment of the invention is illustratedb in the accompanying drawings, of which:

Figure 1:
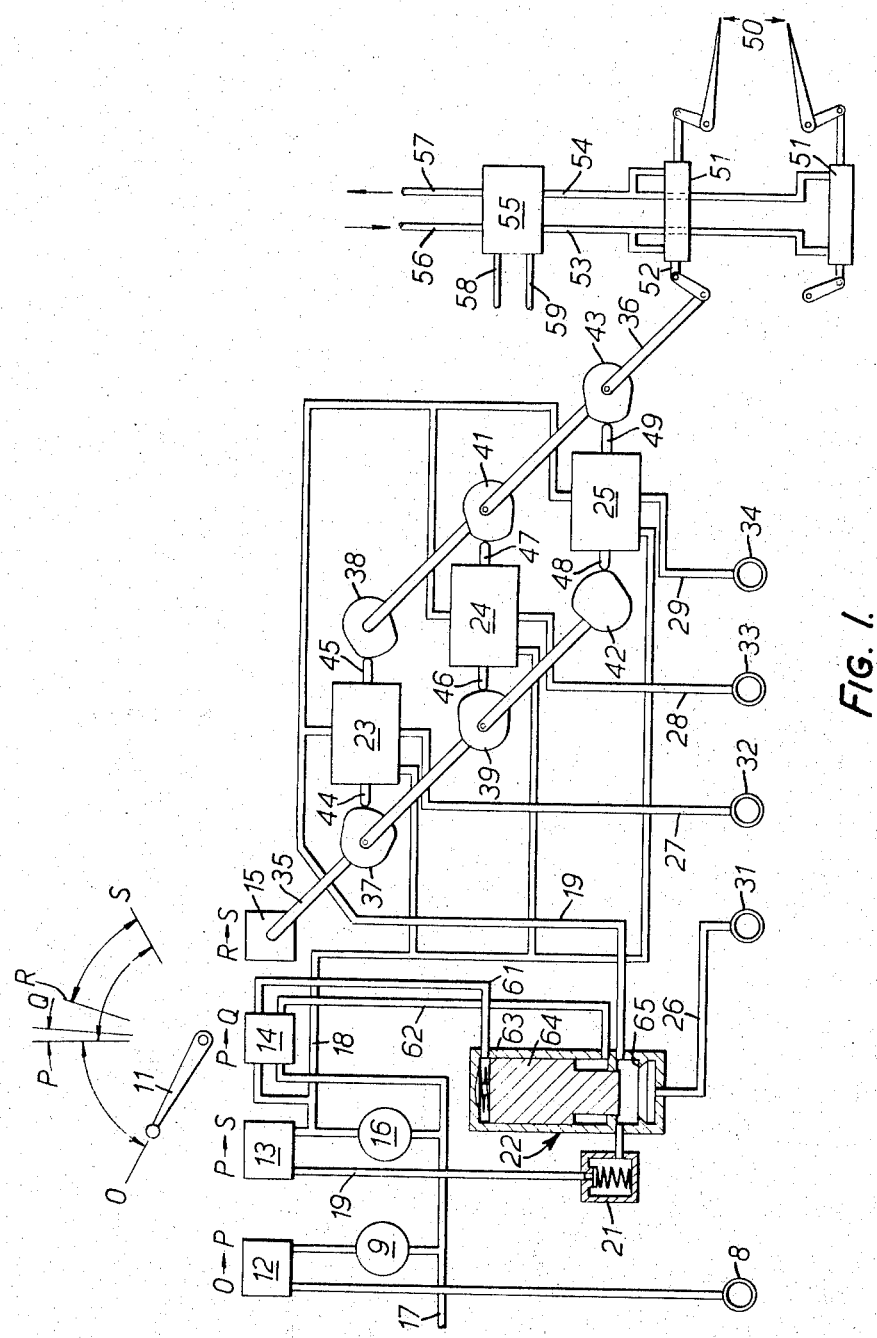
FIGURE 1 is a schematic diagram of a reheat control system for an internal combustion gas turbine engine having a number of reheat galleries.

In FIGURE 1 a throttle member 11 is shown to be angularly movable over the range O to S. A fuel flow control device supplying a main burner gallery 8 is shown generally at 12, together with a main fuel pump 9 which draws fuel from a pipe 17 leading from the source. The device 12 varies the fuel flow to the gallery 8 from zero to a maximum upon movement of the throttle member 11 through the angular range O to P.

A second control device for the main reheat fuel flow shown generally at 13, receives fuel from the pipe 17 through a pump 16, and it is controllable over the angular range P to S to vary the reheat fuel flow to one or more of the reheat galleries 31–34. Both control devices 12 and 13 may be constructed according to known principles and include mechanisms responsive to variable parameters such as air mass flow through the engine.

The present invention is concerned with the selection of the reheat galleries during variation of reheat fuel flow, and with the control of the priming sequence of said galleries. A valve 14 is operable over the range P to Q of the throttle member 11 to bring the first of the galleries into use, while a selector device 15 is operable over the range R to S of the throttle member 11 to bring the subsequent galleries into use consecutively. A pipe 19 from the control device 13 supplies fuel under pressure through a non-return valve 21 and a shut-off cock 22 to a pipe 26 which leads to the first reheat gallery 31, and to each of distribution control devices 23, 24 and 25 which determine the opening of the fuel supply to pipes 27, 28, 29 leading to the respective galleries 32, 33, 34. A separate fuel supply pipe 18 leads from the delivery side of the pump 16 and through branches to each servo device, to provide a source of fuel under pressure for priming the pipes 27, 28, 29 and the galleries 32, 33, 34. This source is independent of the supply through the pipe 19, and it is drawn upon as will be described for priming.

The devices 23, 24 and 25 are controlled by the selector device 15 and by a feedback signal of engine nozzle area. The controlling mechanism is shown for ease of understanding as two camshafts 35 and 36 carrying three sets of cams 37, 38; 39, 41; and 42, 43 which operate on three pairs of plungers 44, 45; 46, 47; and 48, 49 mounted in the respective devices 23, 24 and 25. Each cam has larger and smaller diameter portions for locating the co-operating plunger in inner and outer positions respectively. The plungers are loaded against the respective cams by a spring 98. The camshaft 35 is rotatable by the selector device 15 over the angular range R to S of the throttle member 11. The camshaft 36 is rotatable by the piston rod 52 of a nozzle area control jack 51. Two such jacks are shown controlling the nozzle 50 and having common service pipes 53, 54 from a nozzle control device which is shown generally at 55. The device 55 may be constructed according to known principles for operation by fluid power in supply pipes 56, 57 under the control of variable parameters such as the ratio of engine operating pressures in the control pipes 58, 59. The ratio may be that of compressor delivery pressure to jet pipe pressure.

The shut-off cock 22 comprises a cylinder member 63 having a differential piston 64 therein, the smaller end of which closes on a valve seat 65 in the lowest position to isolate the gallery 31 from the supply pipe 19. The valve 14 is a reversing valve situated between the high pressure pipe 18 and the low pressure pipe 17 on the one hand, and two pipes 61, 62 on the other hand which communicate with the upper, larger area end and with the lower, smaller area end respectively of the piston 64. The valve 14 connects high pressure to the pipe 62 and low pressure to the pipe 61 on turning the throttle member 11 from P to Q whereby the shut-off cock opens. Conversely, the shut-off cock 22 is closed on turning the throttle member 11 from Q to P.

The devices 23, 24 and 25 are similar but the timing of their operations differs on account of the angular setting of the cams on the camshafts 35 and 36 such that the operations occur successively as the control member 11 turns within the angular range R to S.

Figure 2:
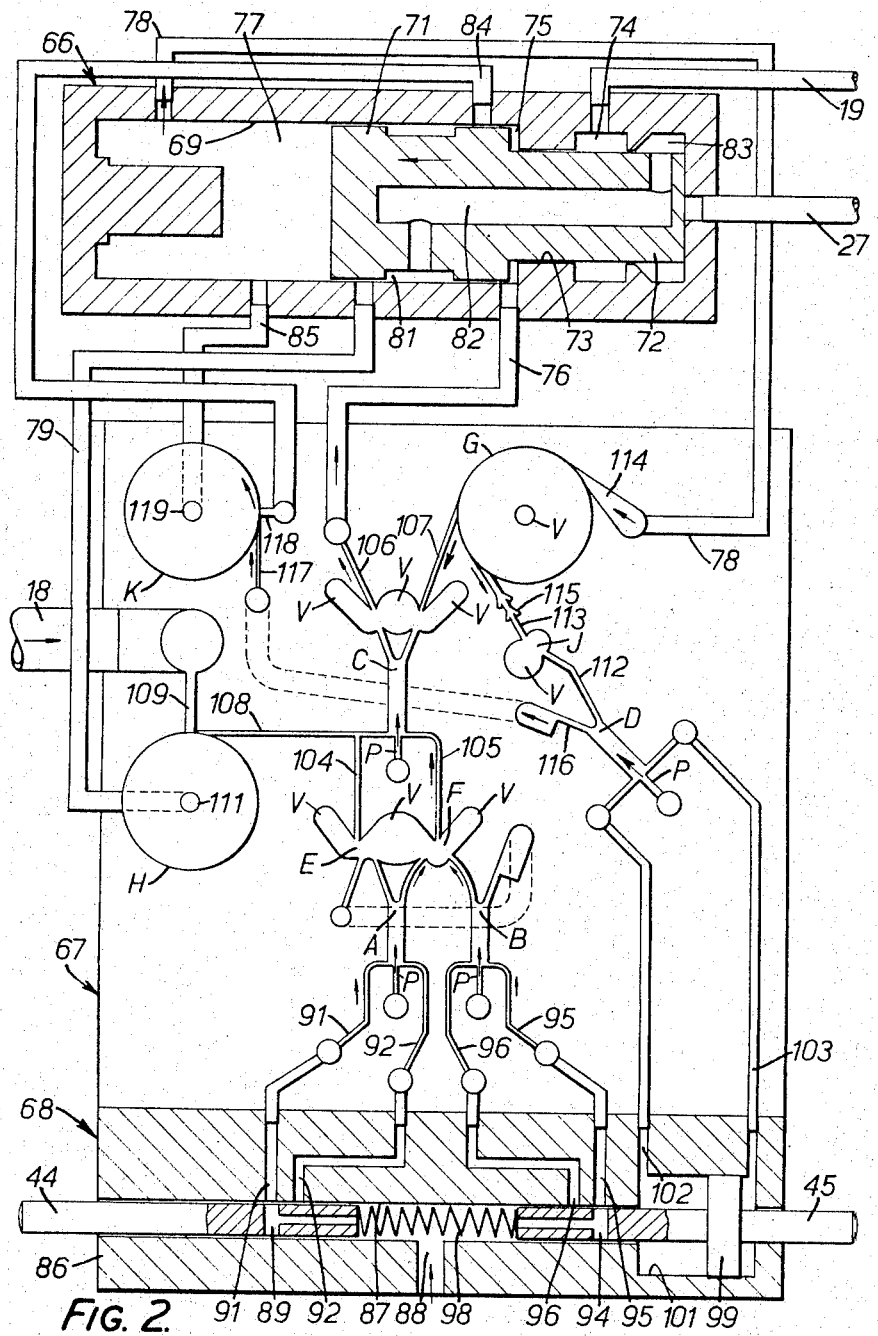
FIGURE 2 is a sectional diagram of a reheat fuel flow control device used for each reheat gallery subsequent to the first.

The distribution control device 23 is illustrated in FIGURE 2. It includes valve means formed as a shut-off cock 66 which is operated by a servo device 67 under the control of a pilot valve device 68. The cock 66 comprises a cylinder bore 69 having a differential piston 71 slidable therein. A stem portion 72 of the piston slides in a bore 73 of lesser diameter to control the opening of a main fuel supply port 74 connected with the supply pipe 19, to the pipe 27. The piston 71 separates an annular chamber 75 to which fuel is admitted through a control passage 76 from the servo device 67 for opening the cock, from a chamber 77 of circular cross section to which fuel is admitted through a control passage 78 from the device 67 for closing the cock. A supply passage 79 for priming fuel from the servo device 67 opens into a bore 69 for co-operation with a groove 81 in the piston 71. A passage 82 in the piston connects the groove 81 to a recess 83 which is closed from the pipe 27 when the piston fully closes the cock 66. Two further passages 84 and 85 having a "hold" function, lead from the cock 66 and open into the bore 69 at axially spaced positions. The passages 76, 78, 79, 84 and 85 constitute ports at their points of opening in the cock 66.

The pilot valve device has a valve body 86 formed with a bore 87, in opposite end portions of which are mounted the plungers 44, 45 previously referred to. A pressure connection for fuel, as servo fluid, opens at 88 in the central part of the bore 87. This servo fluid may be bled from the priming supply in the pipe 18.

The plunger 44 constitutes an input selector member, formed at its inner end with a passage 89 which has a central position connecting servo fluid to a transverse port portion. The outer position of the plunger constitutes a reheat OPENING selection position in which the port 89 is in register with a port 91 in the valve body 86, while the inner position constitutes a CLOSING selection position in which the port 89 is in register with a second port 92 in the valve body.

The plunger 45 constitutes a feedback selector member similarly formed with a port 94 which in the outer, OPENING selection position, registers with a port 95 in the body 86, and which in the inner, CLOSING selection position, registers with a second port 96 in the body 86. The ports 91, 92 and 95, 96 lead to control passages, bearing the same reference numbers, in the servo device 67 which will be described.

The plunger 45 has a piston 99 thereon which acts as a signalling device slidable in a bore 101 to provide a pressure pulse in either of two further control passages 102, 103 which lead to the servo device 67.

The servo device is formed as a fluid logic device 67 which is arranged to open the cock 66 only when both of two controlling conditions are satisfied, firstly, that reheat is selected by the device 15 such that the plunger 44 moves to the position in which the passages 89 and 91 are in register, and secondly, that the nozzle 50 opens sufficiently in response to a change of engine pressure ratio to allow the plunger 45 to move to a position in which the passages 94 and 95 are in register. The device 67 is arranged to close the cock 66 when either of two controlling conditions are satisfied, firstly, that reheat is rejected by the device 15 such that the plunger 44 moves to the position in which the passages 89 and 92 are in register, and secondly, that the nozzle 50 closes sufficiently in response to a change of engine pressure ratio to allow the plunger 45 to move to a position in which the passages 94 and 96 are in register.

The logic circuit includes a first bistable fluid switch A conrolled by fluid pulses in the passages 91, 92 and a second bistable switch B controlled by fluid pulses in the passages 95, 96. Each fluid switch is a known device having a power jet issuing from a nozzle P between two transversely opposed control orifices. A fluid pulse in either control orifice will deflect the power jet into one or the other of two outlets in which the flow remains after termination of the pulse. One outlet from the switch A and one outlet from the switch B provide two inlets to an AND gate F. Fluid flows in the outlet 105 only when fluid is supplied from both inlets. The other outlets from the switches A and B provide the inlets to an AND/OR gate E. Fluid flows in the outlet 104 when fluid is supplied from either or both of the inlets. Fluid which does not enter the outlets 104, 105 of the gates E, F is returned to low pressure from vent chamber V which is disposed on both sides of the fluid streams.

The outlets 104, 105 control a further device which is operable to cause opening or closing of the valve means. This device comprises a bistable switch C which has one outlet 106 leading to the control passage 76, and another outlet 107 which forms one tangential inlet, or outlet, of a vortex summing junction G. Vent chambers V are formed on opposite sides of the outlet streams 106, 107. The outlet 104 is also connected to a control passage 108 which tangentially enters a vortex restrictor H to control the flow of priming fuel from the supply pipe 18 through a radially directed inlet 109 to the circular chamber of the device H, and thence to a control outlet 111 connected to the supply passage 79.

The resistance of a vortex restrictor, of the kind shown at H or K, to fluid flow between the inlet and the outlet, or in the reverse direction, is at a minimum when the flow is radial, but it increases as a function of the velocity of a control stream which enters the chamber tangentially.

The control passages 102, 103 control a further bistable switch D. One outlet 112 of the switch D is connected to a second tangential inlet 113, or outlet, of the vortex summing junction G through a device J which functions as a fluid diode. In this diode J, the passages 112 and 113 are arranged as jets which are spaced one from the other by a vent chamber V. The jet 112 is directed at the jet 113, which then constitutes a receiver for fluid flowing tangentially into the summing junction G, but if fluid flows from the summing junction, the jet 113, which is not directed towards the jet 112, discharges fluid to the vent chamber V.

The summing junction G is formed as a circular chamber into which the passages 113 and 107 are connected tangentially at different positions in the same plane. A further passage 114 of divergent form is connected tangentially at a third position in the same plane but in a sense opposite to that of the passages 107 and 113. The chamber has a control vent V. In general, the flow in the passage 114 is a function of the sum, or difference, of the flows in the passages 107, 113. In particular, the outflow in 114 approaches the full value of the inflow from the switch C when the inputs from the switches C and D are applied simultaneously, and a slightly smaller outflow when the input from the switch C is applied alone. The result is achieved by interposing in the inlet 113 a Tesla type diode 115 which consists of a series of uni-directional nozzles providing a greater resistance to flow from the summing junction G than in the reverse direction. When inflow is applied from the switch D alone, the outflow in 114 falls to a lower value because of loss by reverse flow through the outlet 107 of the switch C to vent.

The other outlet 116 of the switch D leads to a control passage 117 which tangentially enters a vortex restrictor K. A radial inlet 118 to the circular chamber of the vortex restrictor, adjacent to the control passage 117 is connected to the "hold" passage 84, while a central opening 119 in the chamber is connected to the other "hold" passage 85.

The operation of the servo device will now be described. Assuming that the throttle member 11 has started to turn through the angular range R to S for demanding more reheat, the cock 22 is already open and supplying the first gallery 31, the cam 37 has turned far enough to allow the plunger 44 to assume the "select" position shown in FIGURE 2, and the nozzle 50 has opened sufficiently to turn the cam 38 so that the plunger 45 assumes the "select" position shown in FIGURE 2.

Fluid pressure in the ports 91 and 95 diverts the output flows of the switches A and B from the AND/OR gate E to the AND gate F. The resulting flow in the outlet 105 diverts the output of the switch C to the outlet 106, and thence by way of the control passage 76 to the annular chamber 75 of the cock 66. The chamber 77 can discharge through the passage 78 and through the inlets 107, 113 of the summing junction G because there is no flow therein from the switches C and D. The piston 71 will complete the first stage of opening at which the supply passage 79 for priming fuel is connected by way of the groove 81, the passage 82 and the recess 83 to the gallery supply pipe 27. The switching of signals from the AND/OR gate E cancels the vortex producing flow in the control passage 108 of the restrictor H whereby the restriction to flow of priming fuel is removed.

Figure 3:
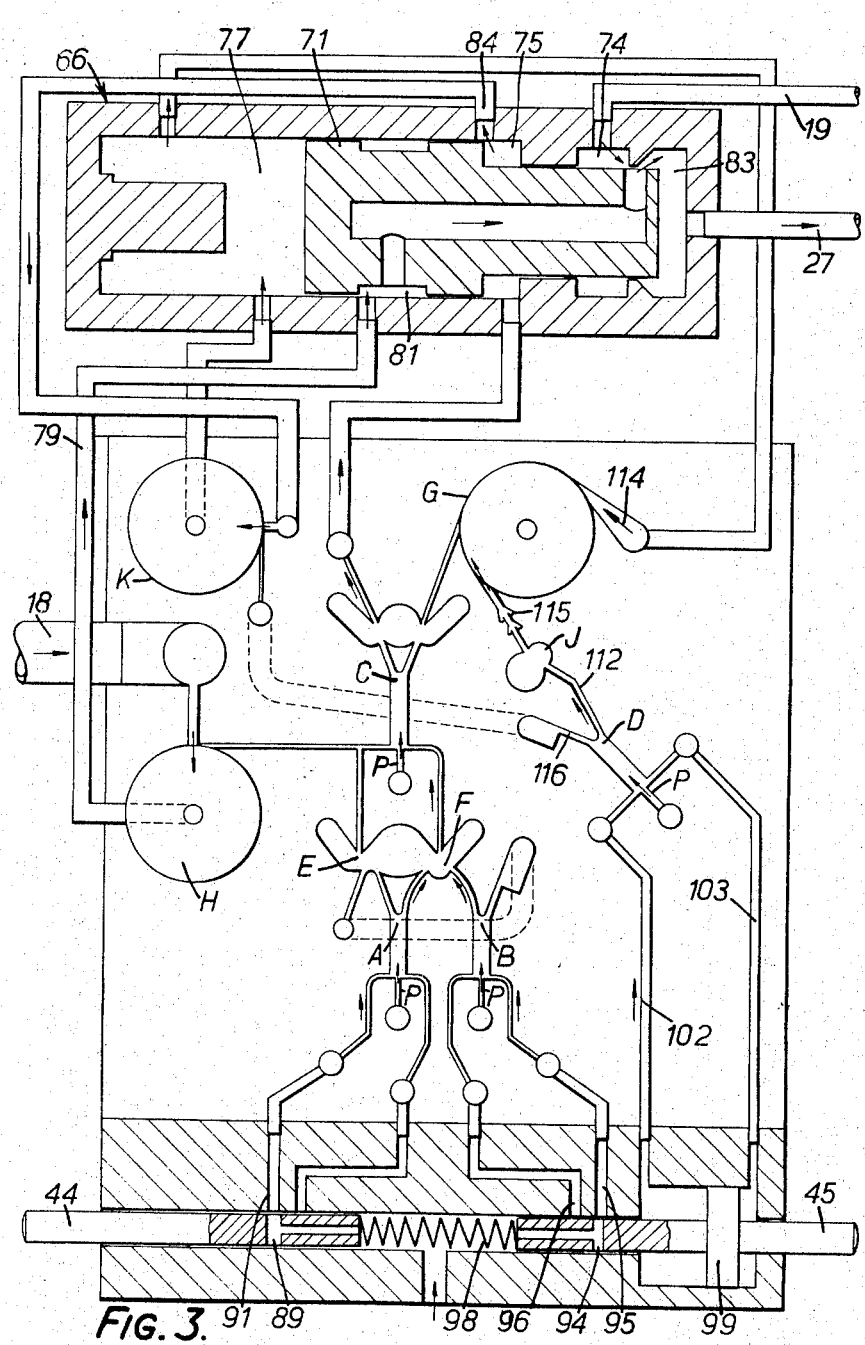
FIGURES 3 and 4 are similar diagrams at different stages of operation.

When the piston 71 moves farther to the intermediate position of FIGURE 3, the groove 81 is open to the supply passage 79 so that priming fuel can flow through the cock to the pipe 27. This movement starts to open the main supply port 74 to the recess 83 and the pipe 27 so that a proportion of the controlled reheat fuel flow is added to the priming flow to the pipe 27 and the gallery 32, and is not immediately burned, while there is a corresponding reduction of controlled reheat fuel flow to the gallery 31 which is burned. The nozzle area 50 is automatically reduced by the device 55 in order to maintain turbine pressure ratio, and the resulting feedback signal turns the cam 38 to move the piston 99 so that there is a pressure pulse in the control passage 102, but the piston movement will not normally be sufficient to move the piston passage 94 into register with the reheat rejection passage 96.

The pressure pulse in the control passage 102 diverts the output of the switch D from the outlet 116 so that the fluid flow resistance of the vortex restrictor K which is effective across the chambers 75 and 77 is reduced, whereby the piston can be maintained in the intermediate position. The output of the switch D is diverted to the outlet 112, through the diode J and through the Tesla type diode 115 to the summing junction G. The reversal of flow in the latter causes the summing junction to increase the fluid pressure in the outlet 114, and hence in the chamber 77. The piston 71 then adopts a position partly covering the "hold" port 84 to provide a pressure regulating effect such that the fluid pressure forces on the differential areas of the piston 71 are balanced. In this piston position, the priming flow continues to deliver to the pipe 27 and the gallery 32, and there is only a small bleed flow from the main supply port 74.

The piston 71 remains in the "hold" position until the pipe 27 and the gallery 32 are primed, and priming fuel discharges into the combustion zone and is burned. The nozzle area 50 is then automatically increased by the device 55 in order to maintain turbine pressure ratio, and the resulting feedback signal turns the cam 38 so that the spring 98 moves the piston 99 outwardly. This movement causes a pressure pulse in the control passage 103 which switches the output of the switch D back to the outlet 116. The flow pattern in the fluid logic device 67 is restored to that of FIGURE 2, whence it is seen that the vortex restrictor K increases the fluid flow resistance across the chambers 75 and 77 so that the piston 71 completes its subsequent opening stage to the fully open position under fluid pressure in the chamber 75 from the outlet 106 of switch C. In the fully open position, the piston 71 closes the "hold" port 85 and the supply passage 79 for priming fuel. Thus, at this position the priming fuel is cut off and the cock 66 is not affected by transient variations in nozzle area.

At full reheat flow to the gallery 32, the throttle member 11 will then be approximately one third of the way from R to S. Further movement will not affect the servo device 23 because the plunger 44 will be engaged by the concentric radially inner portion of the cam 37, but the cam 39 is set at a different phase angle so that it will allow the plunger 46 to move outwardly and select reheat at the gallery 33. The feedback cam 41 is also set at a different phase angle so that the servo device 24 will operate as described to prime the pipe 28 and the gallery 33.

The cams 42 and 43 are arranged so that continued movement of the throttle member 11 operates the servo device 25 to prime the pipe 29 and the gallery 34, after full reheat flow has been reached at the gallery 33.

Figure 4:
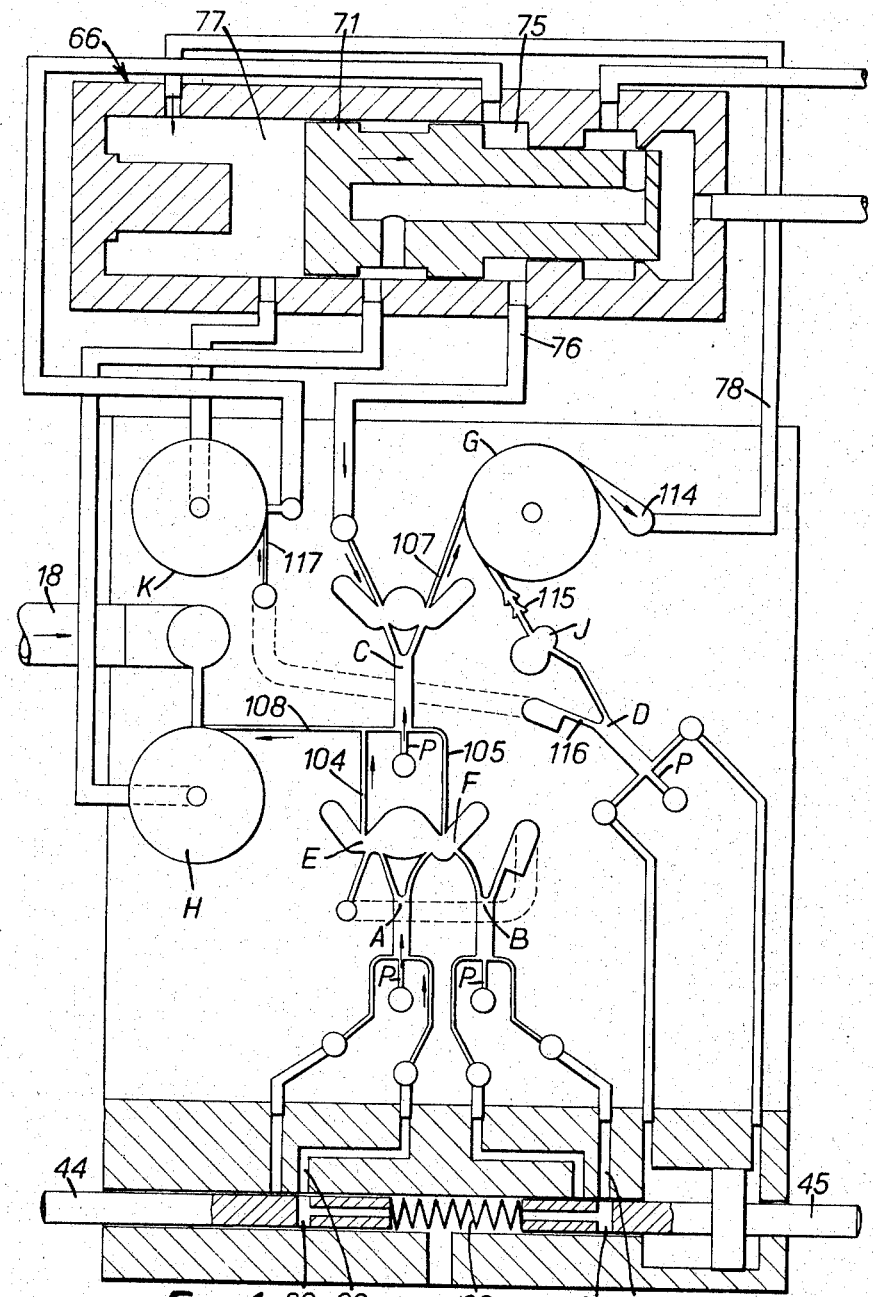

Upon returning the throttle member 11 from S to R, reheat is closed down successively at the galleries 34, 33 and 32. The operation of the servo device 23 on "close down" will be described with reference to FIGURE 4. The cam 37 first moves the plunger 44 inwardly to the position in which fluid servo pressure is supplied through the passage 89 to the passage 92. A pressure pulse in the passage 92 diverts the output flow of the switch A to the AND/OR gate E. The output flow of the switch B continues to the AND gate F because the nozzle area 50 has not yet reduced to cause reheat rejection by the plunger 45.

The switching of the output flow of the switch from the AND gate F causes the remaining input from the switch B to miss the outlet 105. However, the output flow from the switch A is received by the outlet 104 of the AND/OR gate and it provides a controlling flow for the switch C and the vortex restrictor H.

The fluid output of the switch C is therefore diverted to the outlet 107, and thence through the summing junction G to the outlet 114, the control passage 78, and the chamber 77 of the cock 66. The proportion of fluid flow in the outlet 104 passing to the control passage 108, increases the fluid flow resistance of the vortex restrictor H.

No controlling signal is applied to the switch D and the fluid output continues in the outlet 116 leading to the control passage 117 of the vortex restrictor K. The fluid flow entering the vortex restrictor K tangentially increases the fluid flow resistance between the chambers 75 and 77. The chamber 75 can discharge through the passage 76, and the outlet 106 of the switch C to vent because the fluid outflow of this switch is in the outlet 107. The piston 71 will therefore move under the supply of fluid to the chamber 77, to close the cock. Although the supply of priming fuel is connected to the pipe 27 over part of this movement, the increased resistance of the vortex restrictor H will reduce the rate at which priming fuel can temporarily flow.

A reduction of nozzle area 50, resulting for example from flame extinction or another cause, will also cause shut down of reheat fuel to the gallery 32. Inward movement of the plunger 45 to allow a pressure pulse through the passages 94, 96 to the switch B, causes the fluid output of the latter to be diverted from the AND gate F to the AND/OR gate E. Even if the fluid output from the switch A still flows to the AND gate F, the stream will miss the outlet 105 and flow to vent, while the fluid output of the switch B will enter the outlet 104 of the AND/OR gate E. The controlling flow in the outlet 104 will be the same as if the plunger 44 had been moved to select reheat "shut-down," and the shut-off cock 66 will then close as previously described.

The same result is obtained if both plungers 44 and 45 produce a reheat "shut-down" signal because the fluid output from both switches A and B will cause fluid output in the outlet 104 of the AND/OR gate E.

It must be noted that because the switches A and B are bistable, the movement of either plunger 44 or 45 to stop a controlling pressure pulse is not sufficient to change the operation of the servo device. This can only be achieved by sufficient movement to provide an opposite control signal of OPENING or CLOSING as the case may be. Thus, there is provided, especially in the case of the feedback device, a hysteresis or backlash device which overcomes the effect of transient variations of small magnitude in the applied signal.

What is claimed is:

1. A fuel distribution system for a number of burner galleries in a jet propulsion engine, comprising a valve means interposed between a variably controllable main supply of fuel and each burner gallery, each valve means subsequent to that supplying the first gallery at which fuel is burned having also a supply of priming fuel connected thereto and being so arranged that, during the first stage of opening of the valve means, priming fuel flows to the corresponding burner gallery, and during a subsequent stage of opening, the controllable main fuel supply is connected to the burner gallery and the priming flow is stopped, an input selector member movable, conjointly with the control of the main fuel supply, between an OPENING selection position and a CLOSING selection position, in respect of each valve means, a feedback selector member movable in response to a variable engine parameter which is dependent upon the rate at which fuel is burned, said feedback selector member being movable in respect of said valve means to an OPENING selection position when the variable engine parameter lies within a specified range of values, and being movable to a CLOSING selection position when the variable engine parameter lies outside said specified range, and a servo device controlled by the input selector member and by the feedback selector member, the servo device acting to open the valve means only when both the input selector member and the feedback selector member are in their OPENING selection positions, and acting to close the valve means when either of the selector members is in its CLOSING selection position or when both of the selector members are in their respective CLOSING selection positions.

2. A fuel distribution system according to claim 1, wherein the servo device comprises a fluid logic circuit which includes a first bistable fluid switch controlled by the input selector member and a second bistable fluid switch controlled by the feedback selector member such that the fluid output of each switch is not switched from one outlet to the other outlet until the selector member has moved from one selection position to the other selection position, the fluid logic circuit also including a further device causing opening and closing of the valve means in response to one or another of two signals respectively, one signal, for opening the valve means, being produced by the combined fluid output of the first fluid switch in one of its outlets and the fluid output of the second fluid switch in one of its outlets, and the other signal, for closing the valve means, being produced by the fluid output of either of the fluid switches in the other of its outlets, or by fluid flow in said other outlets of both switches.

3. A fuel distribution system according to claim 1 wherein the valve means has an intermediate opening stage between the first and subsequent stages, at which a part of the main flow joins the priming fuel flowing to the gallery, said system including pressure-regulating means operable to maintain the valve means at said intermediate stage, and a signalling device responsive to said variable engine parameter, or to another variable engine parameter which is dependent upon the rate at which fuel is burned, said signalling device controlling the pressure-regulating means to maintain the valve means at said intermediate stage in response to a value of the controlling parameter which indicates reduced combustion during priming, and said signalling device controlling the pressure-regulating means so that the valve means will complete its subsequent stage of opening in response to a value of the controlling parameter which indicates increased combustion upon completion of priming.

4. A fuel distribution system according to claim 1, wherein the variable engine parameter to which the feedback device directly responds is the area of the engine discharge nozzle, said area being controlled in accordance with at least one engine-operating pressure.

5. A fuel distribution system according to claim 3, wherein the parameter to which the signalling device responds is change of nozzle area.

6. A fuel distribution system according to claim 3 for use in a jet propulsion engine of the gas turbine type, wherein the parameter to which the signalling device responds is the ratio of compressor delivery pressure to jet pipe pressure.

References Cited

UNITED STATES PATENTS

| 2,774,215 | 12/1956 | Mock et al. | 60—237 |
| 3,289,411 | 11/1966 | Rogers et al. | 60—237 |
| 3,293,856 | 12/1966 | Tyler | 60—237 |
| 3,293,857 | 12/1966 | Andrews | 60—237 |

JULIUS E. WEST, *Primary Examiner.*